(No Model.)  4 Sheets—Sheet 1.
J. RIGBY.
FILTERING SYSTEM AND PLANT.
No. 407,036. Patented July 16, 1889.
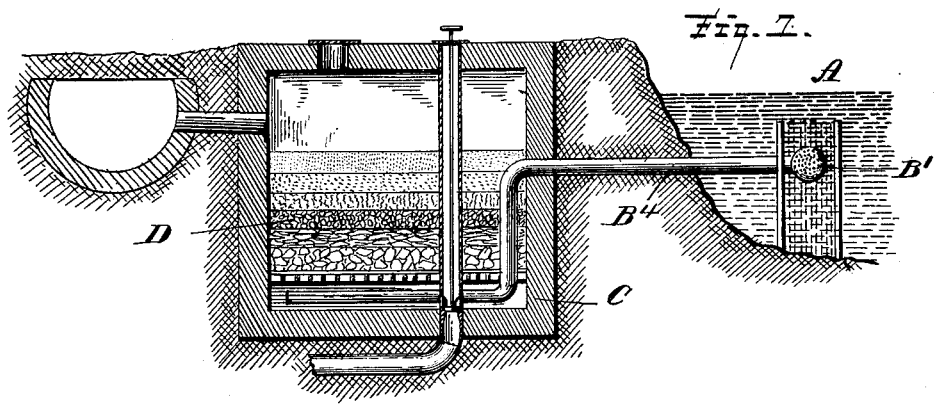
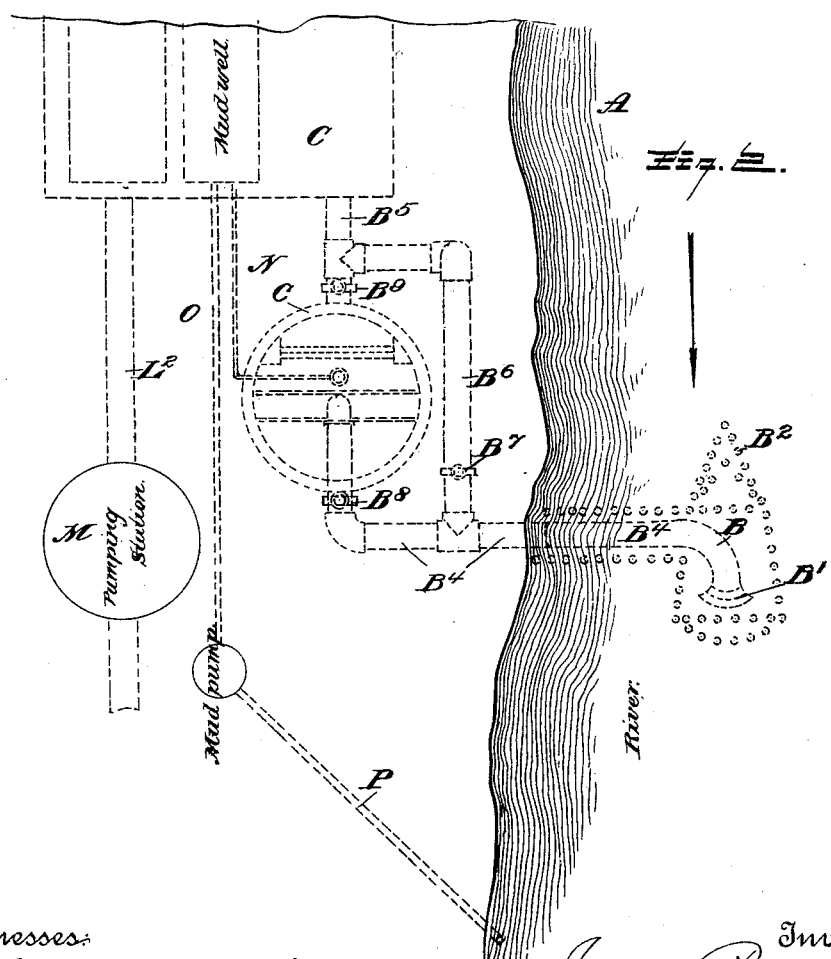
Witnesses:
L. C. Hills
Wm. F. Duvall
Inventor:
James Rigby
E. B. Stocking
Attorney

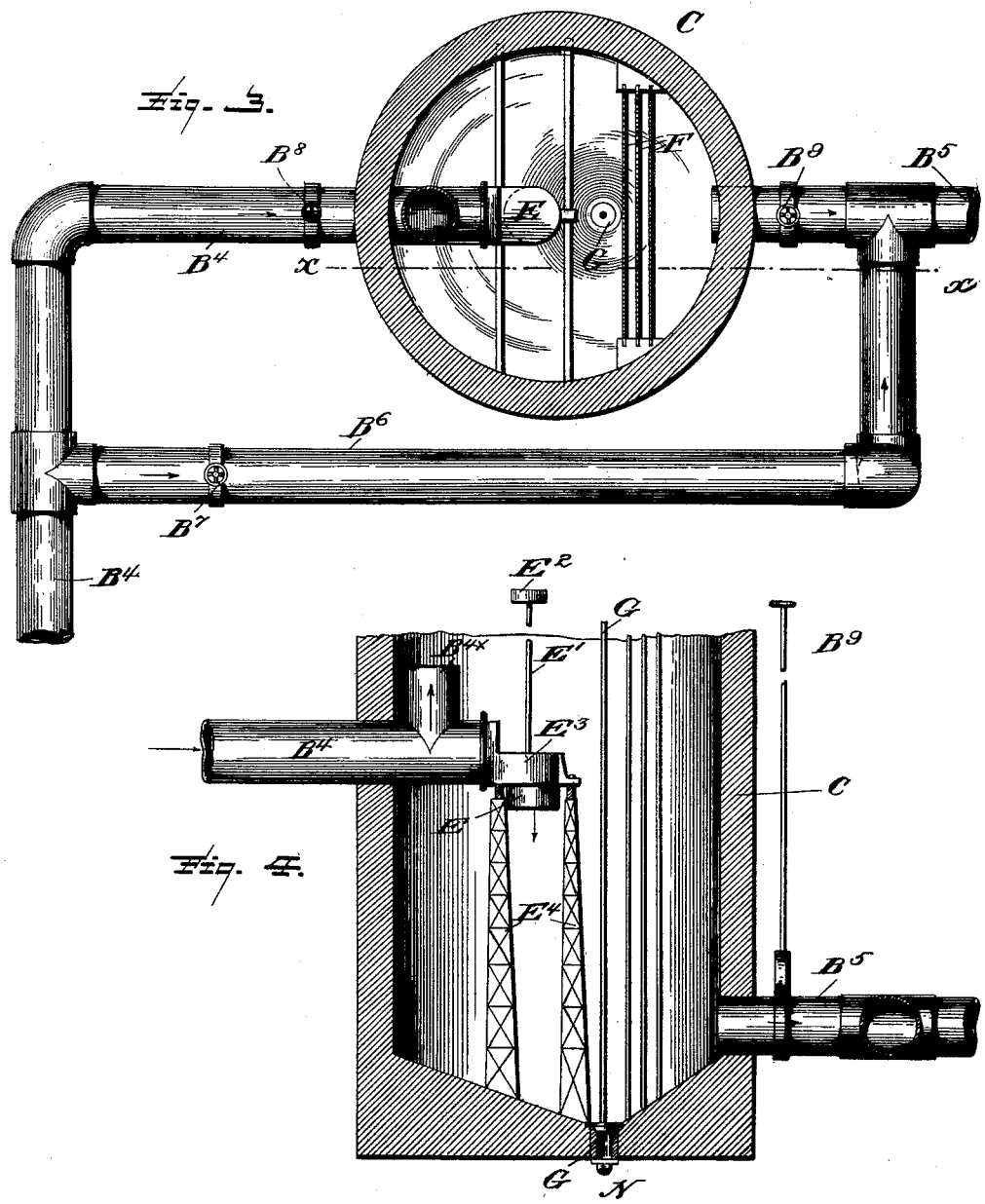

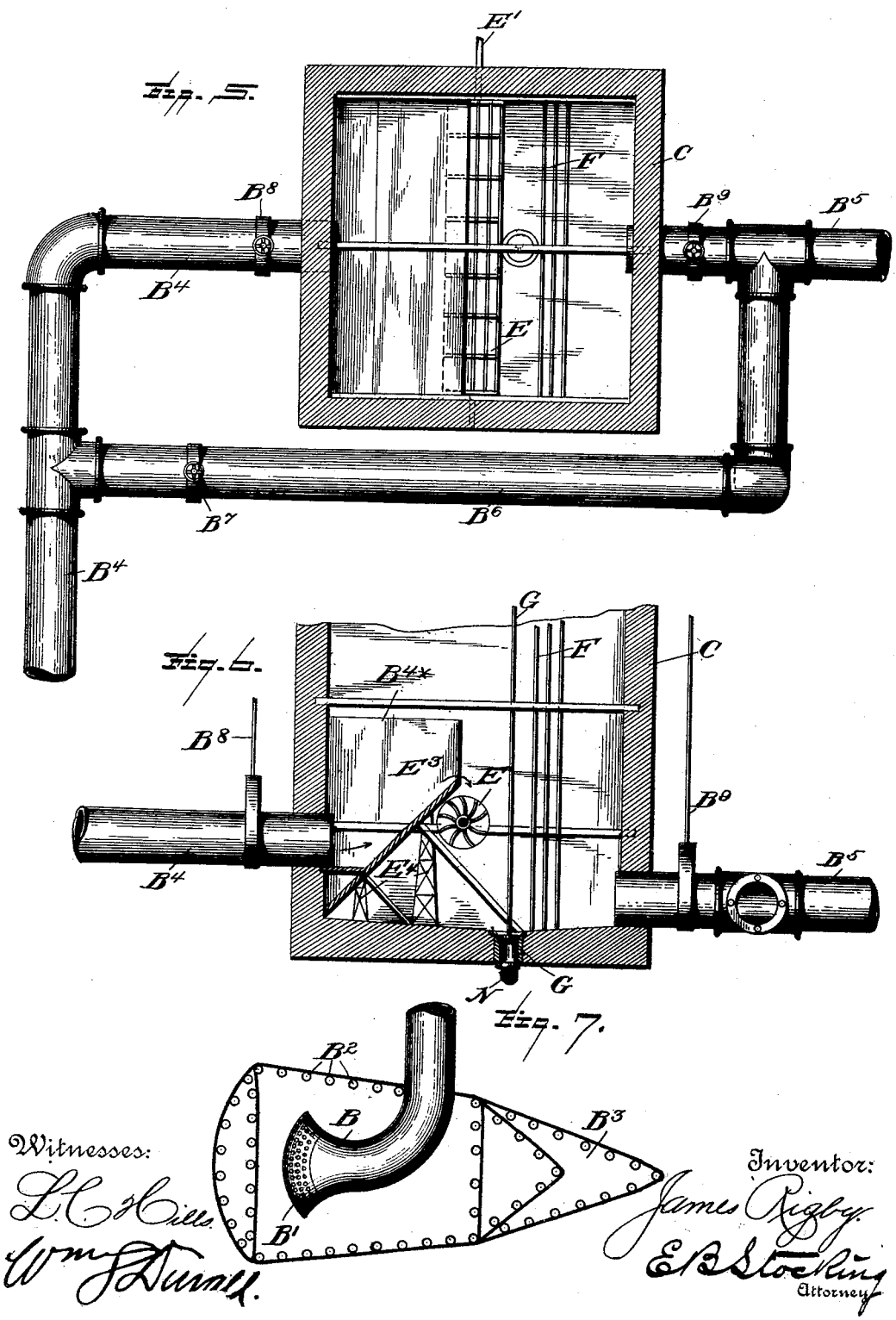

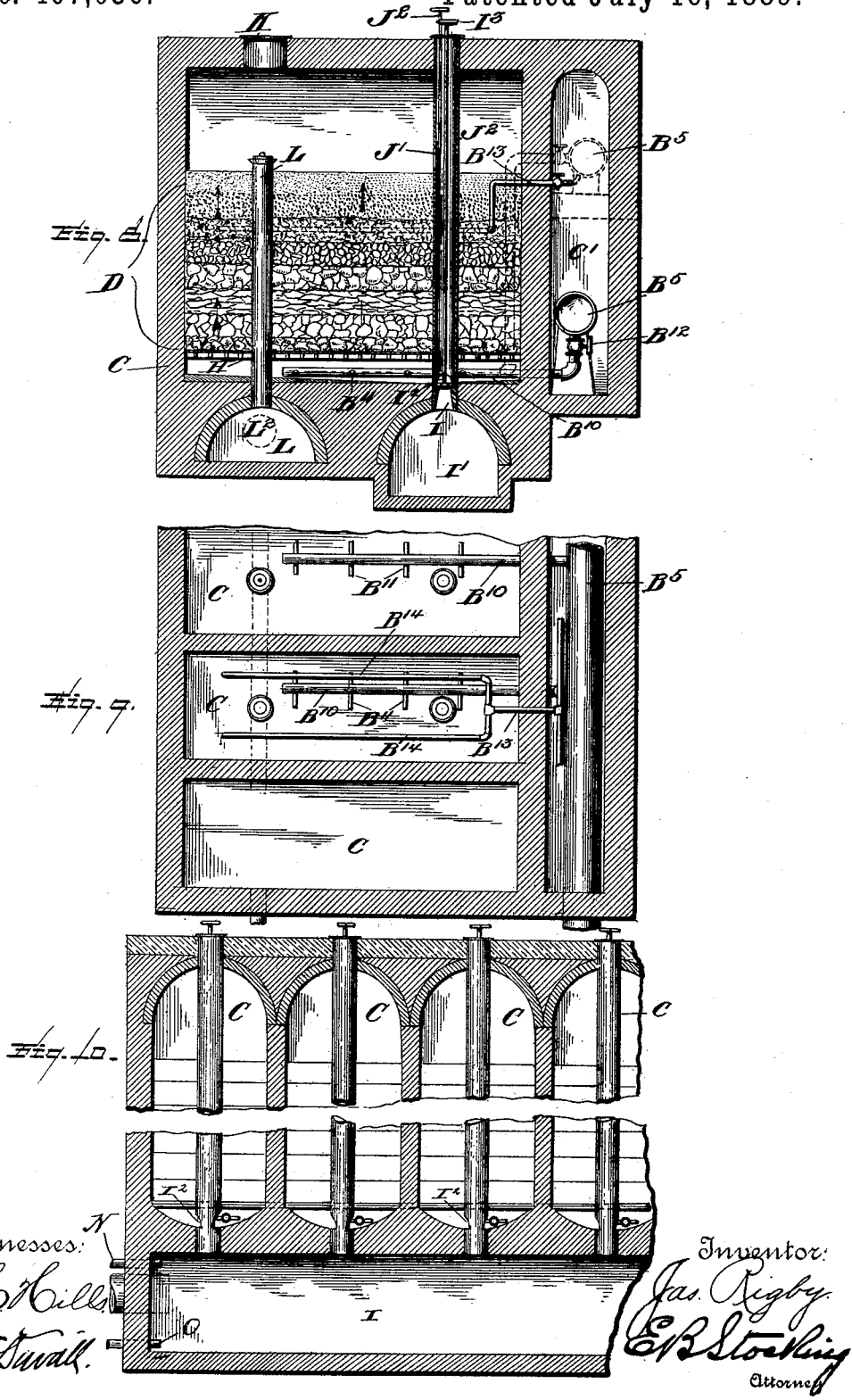

UNITED STATES PATENT OFFICE.

JAMES RIGBY, OF MINNEAPOLIS, MINNESOTA.

FILTERING SYSTEM AND PLANT.

SPECIFICATION forming part of Letters Patent No. 407,036, dated July 16, 1889.

Application filed January 24, 1889. Serial No. 297,384. (No model.)

*To all whom it may concern:*

Be it known that I, JAMES RIGBY, a citizen of the United States, residing at Minneapolis, in the county of Hennepin, State of Minnesota, have invented certain new and useful Improvements in Filtering Plant, of which the following is a specification, reference being had therein to the accompanying drawings.

This invention has relation to a plant for filtering water for city purposes, and among the objects of the invention are to render the water of rivers, lakes, &c., suitable for domestic uses and other purposes, and this by a plant which is of a comparatively slight cost in construction and of a minimum cost of maintenance.

A further object of the invention is to provide in the plant means for agitating and aerating the water and separating from it solids and subsequently subjecting it for filtration, preferably by means involving an upward filtration or a filtration taking place at a time when the water is passing in an upward direction.

Another object of the invention is to provide in the plant such a construction of filtering apparatus as will permit of its being readily cleansed.

Another object of the invention is to construct the plant so as to produce an artificial fall of the water, whereby not only extraneous power for supplying the water to the plant is rendered unnecessary, but the water passing through the plant is thereby rendered available as a motive power for operating portions of the plant for other purposes.

Other objects and advantages of the invention will appear in the following description, and the novel features thereof will be particularly pointed out in the claims.

I have illustrated in the drawings herewith several modifications of a plant adapted to practice my method, and therefore, so far as said method is concerned, do not limit my invention in that regard to any particular apparatus or plant for practicing the same.

The method involved in the application of my invention consists in taking a supply of water at a point a convenient distance below the low-water line of a lake, river, or other natural source and conducting said supply into a filtering-compartment, either with or without preliminary straining, aeration, or agitation in such manner that the water will be delivered into the filtering-compartment at a point some distance below the point of supply and, it may be, some distance below the body of the river, lake, or other source of supply, while in said compartment the filtering medium or media are confined in vertical area to a point substantially equal to or somewhat above or below the point of supply, whereby the water in seeking its level will pass from the point of supply to a point below and from thence upwardly through the filtering medium to a point above the same, from which it may be delivered by any suitable means to desired places for use. Suitable accessories are provided to cleanse the filtering medium and to dispose of the solid matter separated from the water.

Referring to the drawings, Figure 1 is a vertical section of a plant adapted to practice my method. Fig. 2 is a modification involving the accessories constituting a more complete system. Fig. 3 is a plan partly in horizontal section. Fig. 4 is a vertical section on the line $x$ $x$ of Fig. 3, a portion of the conduits being omitted. Figs. 5 and 6 are a plan and section, respectively, similar to Figs. 3 and 4, showing modifications hereinafter described. Fig. 7 is a plan of the intake. Fig. 8 is a longitudinal vertical section of one of the filtering-compartments and its accessories. Fig. 9 is a horizontal section of the series of filtering-compartments, and Fig. 10 is a transverse vertical section of the series of filtering-compartments.

Like letters represent like parts in all the figures of the drawings.

Let A represent a lake or river, which is the source of supply. At a point, preferably about five feet, below the low-water line I arrange an intake B, the opening of which is properly protected by a screen or perforated cap B'. Piles $B^2$, faced or not with planking $B^3$, as desired, are driven into the bed of the lake or river and about the intake in such a manner as to protect the latter from injury by ice or other floating objects. From the intake a pipe $B^4$ extends to the bank and under ground into a well, reservoir, or compartment C, the bottom of which is a desired distance below the point of supply, and it may be below the bed of the river or lake. The walls of the well or compartment may be of masonry or constructed in any usual well-known manner.

As before described, this compartment or well C may be provided therein with filtering media D, extending to any point not above the surface of supply and provided with means for removing therefrom filtered water and of solid substances taken therefrom.

A higher degree of perfection in the working of the plant is secured by providing the well C with a device for agitating and aerating the water that enters the well. In Figs. 3 and 4 I have illustrated a turbine water-wheel for this purpose, from which wheel a shaft $E'$ extends, and is provided with a belt-pulley $E^2$, whereby power may be utilized for practical purposes. In this feature the inlet-pipe $B^4$ is extended into the well and communicates with the turbine in such manner as to give motion thereto, the casing $E^3$ of the turbine or other agitating devices being supported by a suitable trestle or trestles $E^4$ at such an elevation in the well that the water being agitated by the device E becomes aerated in falling therefrom. The inlet-pipe $B^4$ is provided with an outlet $B^{4\times}$, for any surplusage of water beyond that required by or capable of passing through the agitating device. The latter device may be either the turbine, as illustrated in Fig. 4, or an overshot wheel, as illustrated in Figs. 5 and 6.

Screens F are provided for separating from the water any leaves, sticks, or other solid substances before said water enters the conductor $B^5$, which is arranged to carry the water from the receiving-well to the filtering-compartments of the plant.

This system or plant may be provided with several receiving-wells, so that while one is being repaired or cleansed another may be put into use, or each receiving-well may be provided with a by-pass conductor $B^6$. Now, by closing the valves $B^8$ $B^9$ of the supply-pipe $B^4$ and opening the valve $B^7$ in the by-pass $B^6$, the water is conducted into the pipe $B^4$, leading from the well, without passing through the well C. The provision of several screens permits the removal of one or more for cleansing, while others remain to screen the water, so that the screens may be cleaned without interfering with the operation of the plant.

The bottom plug or valve G is provided to empty the well of its contents, if desired. This plug may open into a pipe communicating with the mud system of the plant, hereinafter described. The pipe $B^5$ then leads from the receiving-well to the filtering-compartments of the plant, and it may be arranged within a longitudinal chamber $C'$, along the ends of the series of filtering-compartments C, said chamber being substantially of the same depth as the filtering-compartments, or said chamber may be of less depth. For the purpose of reducing the cost of the plant, on account of the reduction of excavation necessary, said chamber may be of less depth, as shown by dotted lines in Fig. 8. From the pipe $B^5$ there extends into each filtering-compartment a supply-pipe $B^{10}$, having lateral delivery branches or nozzles $B^{11}$, and each of said pipes is provided with a controlling-valve $B^{12}$.

The supply-pipe $B^{10}$ extends along upon or near the bottom of the compartments C, and above it there is formed, by railroad-rails or other means, a false or open floor H, on which is arranged in suitable order the filtering media D. These may be composed of red sandstone or other bowlders, carbonated granite, bog-iron ore, coke, and charcoal, surmounted with a layer or layers of sand of various grades and qualities, in accordance with the nature of the water to be filtered.

The bottom of each filtering-compartment is inclined or graded to an outlet I, communicating with a mud well or conduit $I'$. A valve or plug $I^2$ serves to close said outlet, and is provided with a handle $I^3$, extending above the ground. A pipe $B^{13}$ extends from the supply-pipe $B^5$, or from any other suitable source of supply, into and communicating with one or more of the filtering-layers, as shown at $B^{13}$, Fig. 9, whereby, for the purpose of cleansing the filtering media, water under pressure may be introduced therein, so as to circulate through and agitate (more or less) the finer filtering material and to flow down through the coarser layers, so that the solid substances lodged therein may be carried to the bottom of the filtering-compartments and into the mud-well $I'$.

One means for cleaning the mud-well consists of a valve $J'$ in the pipe $J^2$, which encircles the plug-rod $I^3$, whereby water may be let from the upper portion of the filtering-compartment down into the mud conduit or well $I'$, the valve-plug $I^2$ being fitted with a downwardly-opening clack-valve for that purpose. To operate the valve $J'$, a rod $J^2$ is connected therewith and extends above the surface of the ground. A man-hole K permits access to the compartment. An overflow or discharge pipe L extends through the filtering-compartment and into a conduit $L'$, having an outlet $L^2$, which extends to the pump-station M of the plant. From the receiving-well C—that is, from its discharge-plug opening G—a pipe N is extended to the mud-well of the filtering-compartments, and from said mud-well there extends a pipe O to the mud-pump of the plant, and from said mud-pump a pipe P extends to the river at a point below the intake.

The receiving-well and the filtering-compartments are to be built under ground, and the latter are to be properly arched over and covered, as clearly shown in Fig. 10, and the final delivery of the filtered water is into a proper receptacle or well at the pumping-station, from which it is delivered to desired points for use.

The operation of my invention will be readily understood from the description given; but I will give a condensed description of said operation. The water is taken from a lake or river at a suitable distance below the low-water line thereof, so that the supply and pressure are always uniform. It is conducted by the intake to a point so far below the intake as to produce the necessary pressure for upward filtration and the necessary fall for aeration, agitation, and delivery to the pump-station. It is first taken to the receiving-well, agitated and aerated, and then simply screened from floating substances, when it is conducted to the bottom of a filtering-compartment, and is allowed to rise, in seeking its level, through the various layers of filtering material, and when it reaches above the top layer it overflows into a discharge-pipe passing through said layer into a conductor leading to the reservoir or well at the pump-station, in which it rises to the level of the source of supply. From this well it is pumped to desired places for use. As before indicated, I do not confine my invention to the exact construction of plant herein shown and described, but reserve my right to alter the same in any manner and to any extent to adapt it to various localities and within the skill of persons conversant in matters of this character.

If desired, one of the compartments C may not be provided with any filtering media, but may be employed merely for the storage of clear water, as shown in Fig. 9. A coagulent may be introduced at the receiving-well or at any other desired part of the plant, to destroy bacteria and otherwise aid in rendering the water pure and wholesome. The destruction of bacteria is also aided or accomplished by the pressure maintained by reason of the fall secured by locating the various parts of the plant below the point of supply.

The novel method herein shown and described is not herein claimed, as such will form the subject-matter of a subsequently-filed companion application, Serial No. 303,255, filed March 14, 1889.

Having described my invention, what I claim is—

1. In a filtering plant or system, an intake or supply pipe arranged below the low-water line of a natural source and extended under ground to a receiving-well having agitating, aerating, and screening devices, a filtering-compartment, a pipe leading from the said well to the bottom of said filtering-compartment arranged under ground and below the point of supply, and a conductor leading from said filtering-compartment to a pumping-station, substantially as specified.

2. In a filtering system or plant, a receiving-well provided with a series of screens, an agitating device, a supply-pipe having an overflow and a by-pass pipe, and suitable controlling-valves, substantially as specified.

3. A filtering system or plant comprising a supply-pipe or intake arranged at a suitable point below the low-water line of a natural source, a receiving-well provided with agitating, aerating, and screening devices, a by-pass connected with the supply and discharge pipes of said well, a series of filtering-compartments having the filters thereof arranged below the point of supply, a discharge-pipe extending from each filtering-compartment to a conduit, and a pump-station connected with the conduit, the whole being arranged in excavations below the point of supply, substantially as and for the purpose specified.

4. In a filtering system or plant comprising a filtering-compartment, layers of filtering material, a mud-well, a cleansing-pipe extending into a layer, and a pipe extending through all the layers and communicating with the mud-well, and a valve located above the filtering-layers and arranged in said pipe, whereby the upper layers of the filter may be cleansed and the solids separated therefrom conducted to the mud-well without passing through the lower layers, substantially as specified.

In testimony whereof I affix my signature in presence of two witnesses.

JAMES RIGBY.

Witnesses:
E. B. STOCKING,
ALEX. S. STEWART.